United States Patent
Kawasaki

(10) Patent No.: US 11,305,833 B2
(45) Date of Patent: Apr. 19, 2022

(54) SADDLE-RIDING-VEHICLE FRONT PART STRUCTURE

(71) Applicant: HONDA MOTOR CO., LTD., Tokyo (JP)

(72) Inventor: Yohei Kawasaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 79 days.

(21) Appl. No.: 16/991,065

(22) Filed: Aug. 12, 2020

(65) Prior Publication Data

US 2021/0086861 A1 Mar. 25, 2021

(30) Foreign Application Priority Data

Sep. 24, 2019 (JP) .............................. JP2019-173240

(51) Int. Cl.
| | | |
|---|---|---|
| *B62K 25/04* | (2006.01) | |
| *B62K 21/02* | (2006.01) | |
| *B62K 21/18* | (2006.01) | |
| *B62K 19/02* | (2006.01) | |
| *B62K 19/24* | (2006.01) | |

(52) U.S. Cl.
CPC .............. *B62K 19/02* (2013.01); *B62K 19/24* (2013.01); *B62K 21/02* (2013.01); *B62K 21/18* (2013.01); *B62K 25/04* (2013.01)

(58) Field of Classification Search
CPC ................................. B62K 25/16; B62K 25/24
USPC ........................................................ 280/276
See application file for complete search history.

(56) References Cited

U.S. PATENT DOCUMENTS 10,793,221 B2 * 10/2020 Kuwabara .............. B62K 25/24
2005/0023795 A1 2/2005 Czysz

FOREIGN PATENT DOCUMENTS

| EP | 3769981 A1 * | 1/2021 | ............... B60G 7/02 |
|---|---|---|---|
| JP | 60-104382 | 7/1985 | |
| JP | 2019-018758 | 2/2019 | |

OTHER PUBLICATIONS

Japanese Office Action for Japanese Patent Application No. 2019-173240 dated Aug. 10, 2021.

* cited by examiner

*Primary Examiner* — Kevin Hurley
*Assistant Examiner* — Hosam Shabara
(74) *Attorney, Agent, or Firm* — Amin, Turocy & Watson, LLP

(57) ABSTRACT

A saddle-riding-vehicle front part structure includes: a suspension that is arranged at a rearward position of a steering shaft and at an upward position of a power source; a support shaft that supports the suspension and that is provided between a pair of right and left arms; and a cover that is provided between the steering shaft and the suspension and that covers a space between the pair of right and left arms, wherein the cover includes a pair of right and left first cover parts that correspond to the pair of right and left arms and a second cover part that corresponds to the suspension, and the pair of right and left first cover parts and the second cover part are displaceable independently from each other.

8 Claims, 8 Drawing Sheets

SADDLE-RIDING-VEHICLE FRONT PART STRUCTURE

CROSS-REFERENCE TO RELATED APPLICATION

Priority is claimed on Japanese Patent Application No. 2019-173240, filed on Sep. 24, 2019, the contents of which are incorporated herein by reference.

BACKGROUND

Field of the Invention

The present invention relates to a saddle-riding-vehicle front part structure.

Background

In the related art, a front part structure of a saddle riding vehicle is known in which a suspension is arranged at a rearward position of a steering shaft and at an upward position of a vehicle body. The suspension is supported by a support shaft between a pair of right and left arms. For example, in Japanese Unexamined Patent Application, First Publication No. 2019-18758, a cover that covers a space between the pair of right and left arms is provided between the steering shaft and the suspension. The cover includes a first wide width part that extends in a vertical direction along a rear part of a cylindrical holder which rotatably supports the steering shaft and that extends in a vehicle width direction, a second wide width part that extends rearward from a lower end of the first wide width part and that extends in the vehicle width direction such that an upper surface of the pair of right and left arms is covered, and a rearward extension part that extends from a rear end of the second wide width part toward a lower rear end of the suspension.

SUMMARY

There may be cases in which, in accordance with a required specification of the suspension, a component layout around the suspension is changed. For example, there may be cases in which a component such as an actuator is arranged at an upper part of the suspension. In this case, when the second wide width part spreads in the vehicle width direction such that the upper surface of the pair of right and left arms is covered, there is a high possibility that a problems occurs in maintaining a stroke amount of the suspension.

An aspect of the present invention is intended to maintain a stroke amount of a suspension in a front part structure of a saddle riding vehicle in which the suspension is arranged at a rearward position of a steering shaft and at an upward position of a vehicle body.

A saddle-riding-vehicle front part structure according to a first aspect of the present invention includes: a suspension that is arranged at a rearward position of a steering shaft and at an upward position of a power source; a support shaft that supports the suspension and that is provided between a pair of right and left arms; and a cover that is provided between the steering shaft and the suspension and that covers a space between the pair of right and left arms, wherein the cover includes a pair of right and left first cover parts that correspond to the pair of right and left arms and a second cover part that corresponds to the suspension, and the pair of right and left first cover parts and the second cover part are displaceable independently from each other.

A second aspect of the present invention is the saddle-riding-vehicle front part structure according to the first aspect, wherein the second cover part may be arranged at a lower position than the pair of right and left first cover parts.

A third aspect of the present invention is the saddle-riding-vehicle front part structure according to the first or second aspect, wherein the cover may have a slit between the pair of right and left first cover parts and the second cover part.

A fourth aspect of the present invention is the saddle-riding-vehicle front part structure according to any one of the first to third aspects, wherein a length of the slit may be larger than a swing amount of the suspension.

A fifth aspect of the present invention is the saddle-riding-vehicle front part structure according to any one of the first to fourth aspects, wherein the pair of right and left first cover parts may be in contact with the pair of right and left arms.

A sixth aspect of the present invention is the saddle-riding-vehicle front part structure according to any one of the first to fifth aspects, wherein the cover may have flexibility, and a holder that has a cylindrical shape and that rotatably supports the steering shaft and a bend part that is bent along the arm may be provided on the cover.

A seventh aspect of the present invention is the saddle-riding-vehicle front part structure according to any one of the first to sixth aspects, wherein the cover may further include a wide width part that extends in a vertical direction along a rear part of a holder which has a cylindrical shape and which rotatably supports the steering shaft and that extends in a vehicle width direction, each of the pair of right and left first cover parts may extend rearward from a lower end of each of right and left side portions of the wide width part and cover an upper surface of the pair of right and left arms, and the second cover part may be arranged to be spaced from the pair of right and left first cover parts and in a space in the vehicle width direction between the pair of right and left first cover parts and extend from a lower end of a middle portion of the wide width part toward a lower rear end of the suspension.

An eighth aspect of the present invention is the saddle-riding-vehicle front part structure according to the seventh aspect, wherein the second cover part may include a first extension portion that extends rearward and downward from a lower end of the wide width part and a second extension portion that extends frontward and downward from a rear end of the first extension portion, and the second extension portion may extend along an axis line direction of the suspension.

In the saddle-riding-vehicle front part structure according to the first aspect of the present invention, the cover includes the pair of right and left first cover parts that correspond to the pair of right and left arms and the second cover part that corresponds to the suspension, and the pair of right and left first cover parts and the second cover part are displaceable independently from each other. Thereby, the following advantages are achieved.

When a component layout around the suspension is changed in accordance with a required specification of the suspension (for example, when a component such as an actuator is arranged at an upper part of the suspension), it is possible to set heights of the pair of right and left first cover parts and a height of the second cover part to be different from each other. Accordingly, it is possible to maintain a stroke amount of the suspension.

In the saddle-riding-vehicle front part structure according to the second aspect of the present invention, the second cover part is arranged at a lower position than the pair of right and left first cover parts, and thereby, the following advantages are achieved.

It is possible to increase a stroke amount of the suspension compared to a case in which the second cover part is arranged at a height equal to or higher than a height of the pair of right and left first cover parts.

In the saddle-riding-vehicle front part structure according to the third aspect of the present invention, the cover has the slit between the pair of right and left first cover parts and the second cover part, and thereby, the following advantages are achieved.

The pair of right and left first cover parts and the second cover part becomes smoothly displaceable independently from each other compared to a case in which there is an interposed part between the pair of right and left first cover parts and the second cover part. Accordingly, the suspension can be smoothly stroked.

In the saddle-riding-vehicle front part structure according to the fourth aspect of the present invention, the length of the slit is larger than the swing amount of the suspension, and thereby, the following advantages are achieved.

It is possible to increase a stroke amount compared to a case in which the length of the slit is equal to or less than the swing amount of the suspension. Additionally, it is possible to arrange a large suspension.

In the saddle-riding-vehicle front part structure according to the fifth aspect of the present invention, the pair of right and left first cover parts are in contact with the pair of right and left arms, and thereby, the following advantages are achieved.

Since each of the pair of right and left first cover parts follows the motion of each of the pair of right and left arms, the pair of right and left first cover parts can block a gap that occurs at the time of swing of the pair of right and left arms. Additionally, it is possible to prevent the first cover part from being caught at the time of swing of the arm.

In the saddle-riding-vehicle front part structure according to the sixth aspect of the present invention, the cover has flexibility, and the holder that has a cylindrical shape and that rotatably supports the steering shaft and the bend part that is bent along the arm are provided on the cover. Thereby, the following advantages are achieved.

Since the cover follows the motion of the pair of right and left arms, it is possible to block a gap that occurs at the time of swing of the pair of right and left arms by the cover.

In the saddle-riding-vehicle front part structure according to the seventh aspect of the present invention, the cover further includes the wide width part that extends in the vertical direction along the rear portion of the holder which has a cylindrical shape and which rotatably supports the steering shaft and that extends in the vehicle width direction, each of the pair of right and left first cover parts extends rearward from the lower end of each of the right and left side portions of the wide width part and covers the upper surface of the pair of right and left arms, and the second cover part is arranged to be spaced from the pair of right and left first cover parts and in the space in the vehicle width direction between the pair of right and left first cover parts and extends from the lower end of the middle portion of the wide width part toward the lower rear end of the suspension. Thereby, the following advantages are achieved.

The wide width part, the first cover part, and the second cover part can allow a clearance around the suspension to be as small as possible.

In the saddle-riding-vehicle front part structure according to the eighth aspect of the present invention, the second cover part includes the first extension portion that extends rearward and downward from the lower end of the wide width part and the second extension portion that extends frontward and downward from the rear end of the first extension portion, and the second extension portion extends along the axis line direction of the suspension. Thereby, the following advantages are achieved.

It is possible to attach the cover without depending on expansion and contraction of the suspension.

DESCRIPTION OF THE EMBODIMENTS

Figure 1:
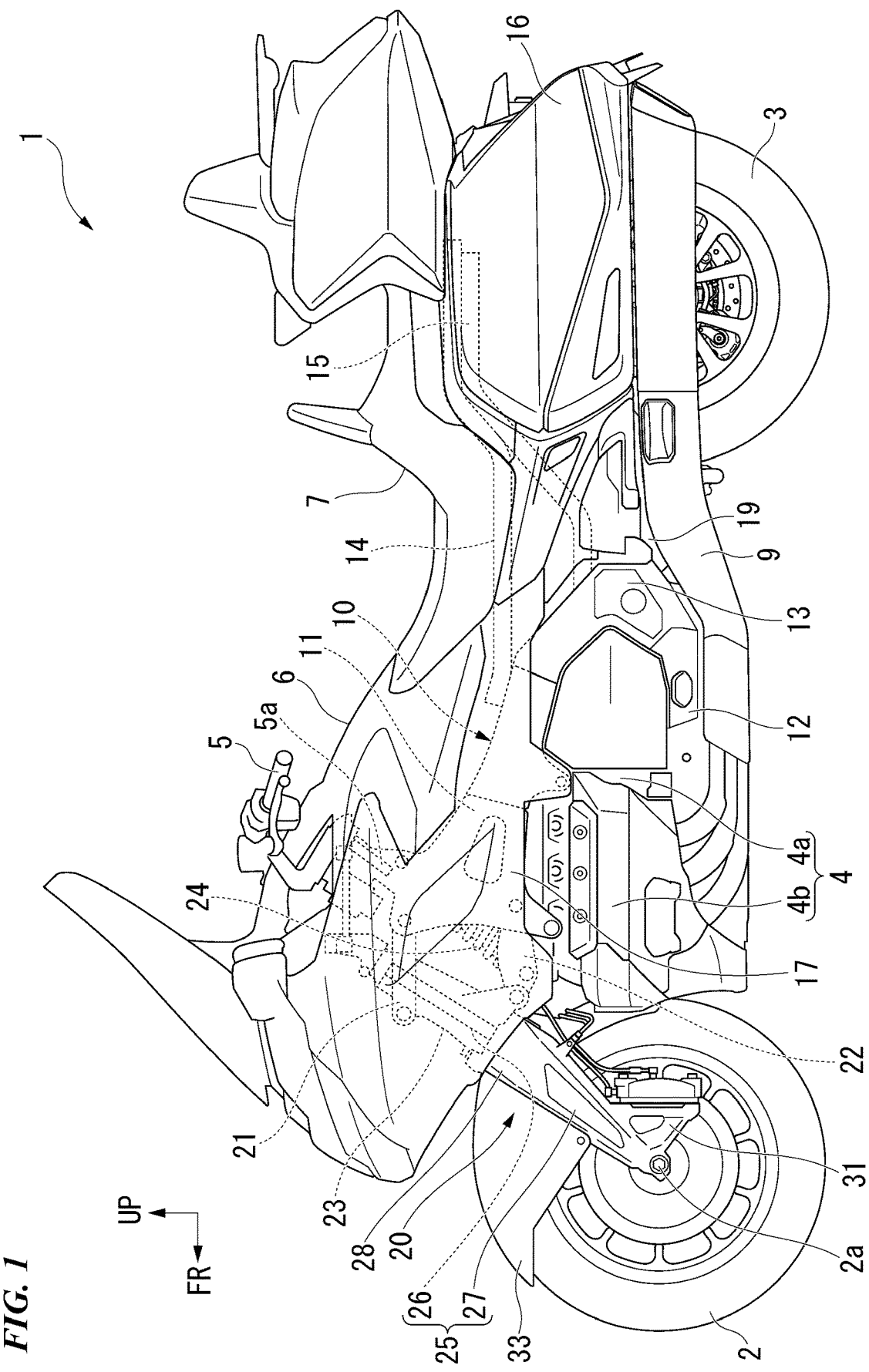
FIG. 1 is a left side view of a motorcycle according to an embodiment of the present invention.

Hereinafter, an embodiment of the present invention will be described with reference to the drawings. Front, rear, right, and left directions and the like in the following description are the same as front, rear, right, and left directions and the like in a vehicle described below if there is no particular description. An arrow FR which indicates a vehicle frontward direction, an arrow LH which indicates a vehicle leftward direction, and an arrow UP which indicates a vehicle upward direction are shown in the drawings referred to in the following description.

<Entire Vehicle>

FIG. 1 shows a large motorcycle 1 that includes a horizontally-opposed six-cylinder engine 4 (power source) between a front wheel 2 and a rear wheel 3 as an example of a saddle riding vehicle. Hereinafter, the motorcycle may be simply referred to as a "vehicle".

The engine 4 is supported by a vehicle body frame 10. The vehicle body frame 10 includes: a main frame 11 that rotatably supports a handle steering shaft 5a rotated by a handle 5; a lower frame 12 that is attached to a front lower part of the main frame 11 and that extends in a front-to-rear direction below the main frame 11; a pair of right and left pivot plates 13 that extend in a vertical direction and that bridge a space between rear end parts of the main frame 11 and the lower frame 12; a pair of right and left seat rails 14 that extend rearward from the rear end part of the main frame 11; and a pair of right and left sub-frames 15 that extend rearward and upward from the pivot plate 13 and that is joined to a rear end part of the seat rail 14.

The engine 4 is arranged below the main frame 11. The engine 4 is supported by the main frame 11 and the lower frame 12. The engine 4 includes a crankcase 4a and right and left cylinders 4b each protruding laterally from the crankcase 4a. Three cylinder bores are formed to be aligned in a front-to-rear direction on each of the right and left cylinders 4b.

A piston is provided slidably in each of the cylinder bores.

A fuel tank 6 is arranged above the main frame 11. The fuel tank 6 extends rearward and downward from a frontward direction along the incline of the main frame 11. The fuel tank 6 is supported by the main frame 11. A seat 7 on which an occupant is seated is arranged at a rearward position of the fuel tank 6. The seat 7 is supported by a seat rail 14. An air cleaner box (not shown) is arranged above the engine 4 and in a space in a vehicle width direction between the right and left main frames 11.

A front end part of the rear swing arm 19 that extends in a front-to-rear direction is rotatably supported by the pivot plate 13. The rear swing arm 19 is swingable in a vertical direction.

The rear wheel 3 is supported at a rear end part of the rear swing arm 19. The rear swing arm 19 is arranged on an inner side in the vehicle width direction of an exhaust muffler 9 that extends in a front-to-rear direction at a lower side of the vehicle. Right and left trunks 16 are provided on right and left sides of the rear wheel 3. An upper side of the right and left cylinders 4b is covered from the outside in the vehicle width direction by a front side cowl 17.

<Front Suspension Mechanism>

A front suspension mechanism 20 is supported by a front part of the main frame 11.

The front suspension mechanism 20 includes an upper link 21, a lower link 22, a fork support part 23 (holder), a front cushion unit 24 (suspension), and a front swing arm 25.

Figure 2:
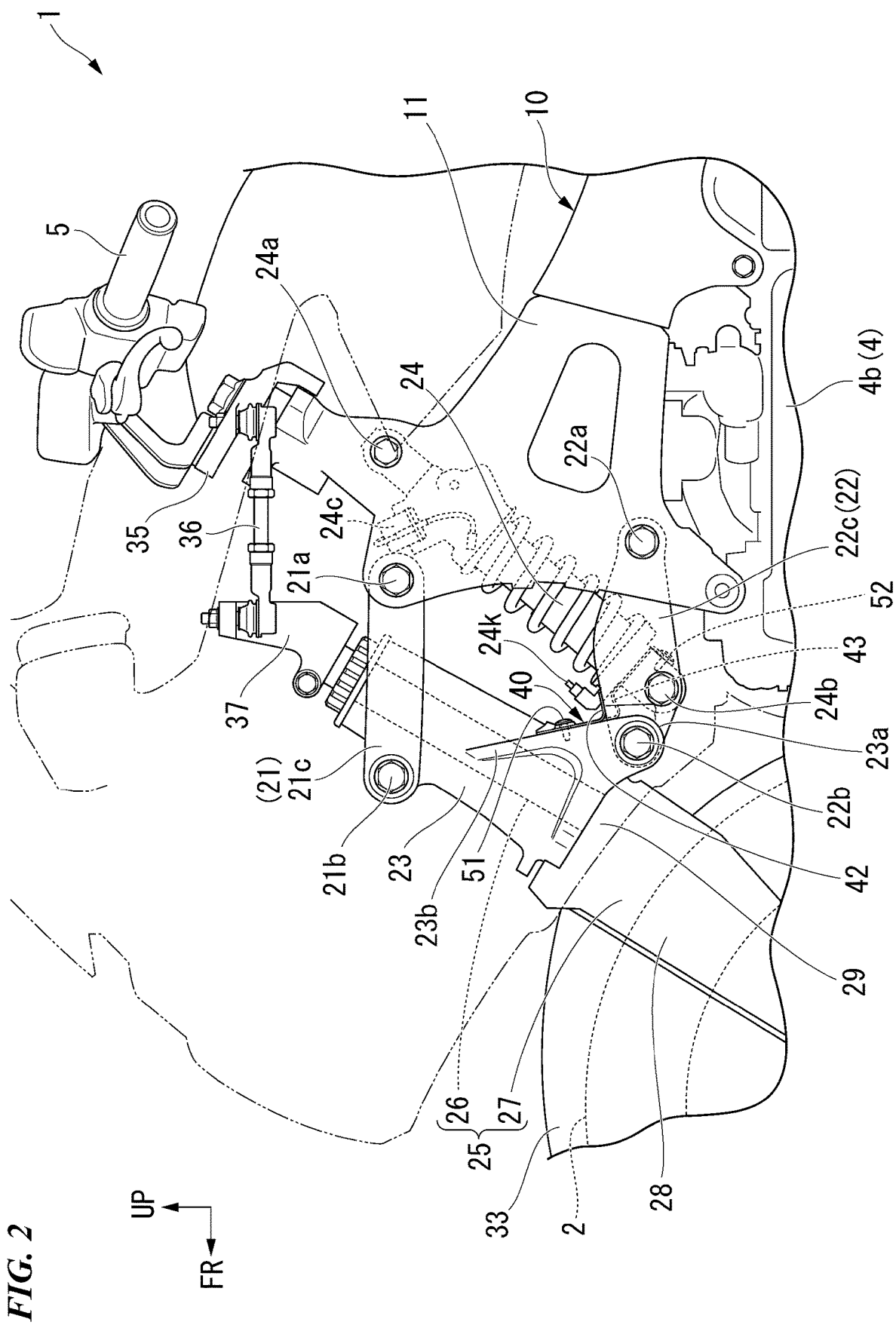
FIG. 2 is a left side view of a vehicle front part of the motorcycle.

As shown in FIG. 2, the upper link 21 and the lower link 22 are arranged to be spaced in a vertical direction at a front part of the main frame 11. The upper link 21 and the lower link 22 are supported to swingable upward and downward via support shafts 21a and 22a at a front part of the main frame 11. The upper link 21 and the lower link 22 extend in a front-to-rear direction and are arranged substantially in parallel with each other.

The fork support part 23 defines a cylindrical shape and is inclined rearward. A front end part of the upper link 21 is pivotally connected to an upper front portion of the fork support part 23 via a support shaft 21b.

A front end portion of the lower link 22 is pivotally connected to a lower rear portion of the fork support part 23 via a support shaft 22b.

An upper end part of the front cushion unit 24 is swingably supported via a support shaft 24a by the main frame 11. A lower end portion of the front cushion unit 24 is swingably supported via a support shaft 24b by the lower link 22. An actuator 24c is attached to an upper portion (a lower region of the support shaft 24a) of the front cushion unit 24.

The front swing arm 25 is arranged to be inclined rearward. The front swing arm 25 includes a front wheel steering shaft 26 (steering shaft) pivotally supported by the fork support part 23 and a fork part 27 connected integrally to a lower end part of the front wheel steering shaft 26.

The front wheel steering shaft 26 is inserted through a fork shaft insertion hole formed in the fork support part 23. The front wheel steering shaft 26 is pivotally supported by the fork support part 23 in a state of being inserted through the fork shaft insertion hole.

The fork part 27 includes a pair of right and left arm portions 28 that extend in a vertical direction so as to be inclined rearward and a bridge portion 29 that integrally connects together upper ends of the right and left arm portions 28.

A front wheel axle 2a (refer to FIG. 1) that rotatably supports the front wheel 2 is attached to a lower end of the right and left arm portions 28. A lower end part of the front wheel steering shaft 26 is attached to the bridge portion 29.

As shown in FIG. 1, the arm portion 28 is formed in a taper shape such that a lower end side is tapered. A front caliper support part 31 is provided on a rear lower end of the arm portion 28. A front fender 33 that covers an upper part of the front wheel 2 is attached to the arm portion 28.

As shown in FIG. 2, a lower connection part 23a that protrudes rearward and downward is formed on a rear lower portion of the fork support part 23. A front end part of the lower link 22 is connected to the lower connection part 23a.

A rib 23b for reinforcing the lower connection part 23a is formed on right and left side surfaces of the fork support part 23. The rib 23b defines a V shape that opens frontward and upward in a side view. The rib 23b extends frontward and upward to be branched from the lower connection part 23a such that a rib height is increased toward the lower connection part 23a side in a side view.

Figure 3:
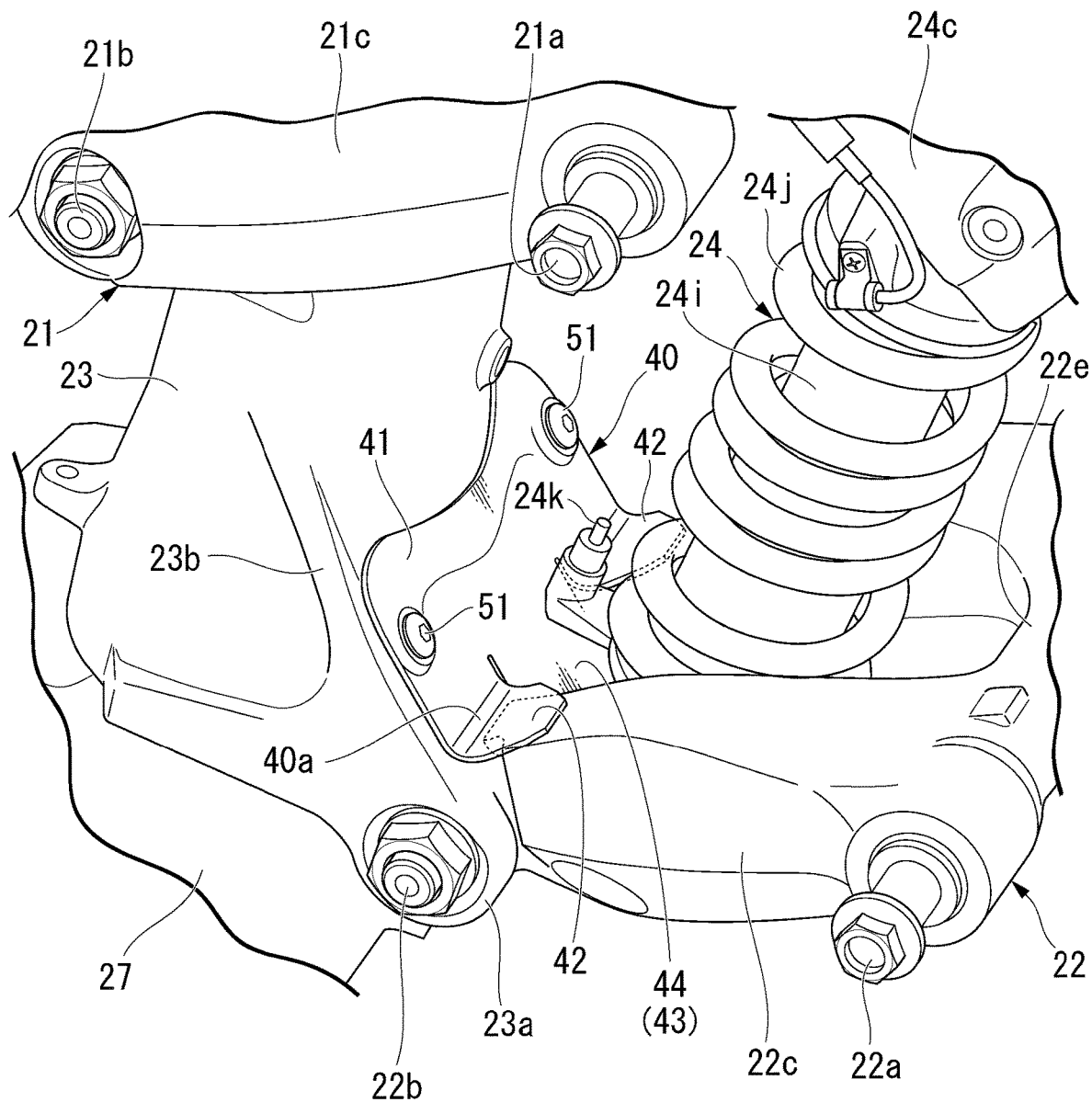
FIG. 3 is a perspective view of a front part structure of the motorcycle when seen from a left rear direction.

As shown in FIG. 3, the upper link 21 integrally includes a pair of right and left upper arms 21c that extend in the front-to-rear direction and a cross member 21d that connects together rear end parts of the right and left upper arms 21c. The right and left upper arms 21c are arranged on both right and left sides of an upper portion of the fork support part 23.

The lower link 22 integrally includes a pair of right and left lower arms 22c that extend in the front-to-rear direction, a front cross member 22d (refer to FIG. 5) that connects together front end parts of the right and left lower arms 22c, and a rear cross member 22e that connects together rear end parts of the right and left lower arms 22c. The right and left lower arms 22c are arranged on both right and left sides of a lower portion of the front cushion unit 24.

As shown in FIG. 3, the front cushion unit 24 includes a rod-type damper 24i inclined such that a higher side is located at a more rear side, a coil spring 24j that is wound around the damper 24i, and a connection part 24k to which a cushion control wire (not shown) is connected. The front cushion unit 24 is an electronically controlled suspension having the connection part 24k. The connection part 24k protrudes from a lower end front part of the front cushion unit 24 directed toward a left upward direction. For example, the connection part 24k is connected via the cushion control wiring to a motor driver, a battery, and the like (not shown).

Figure 4:
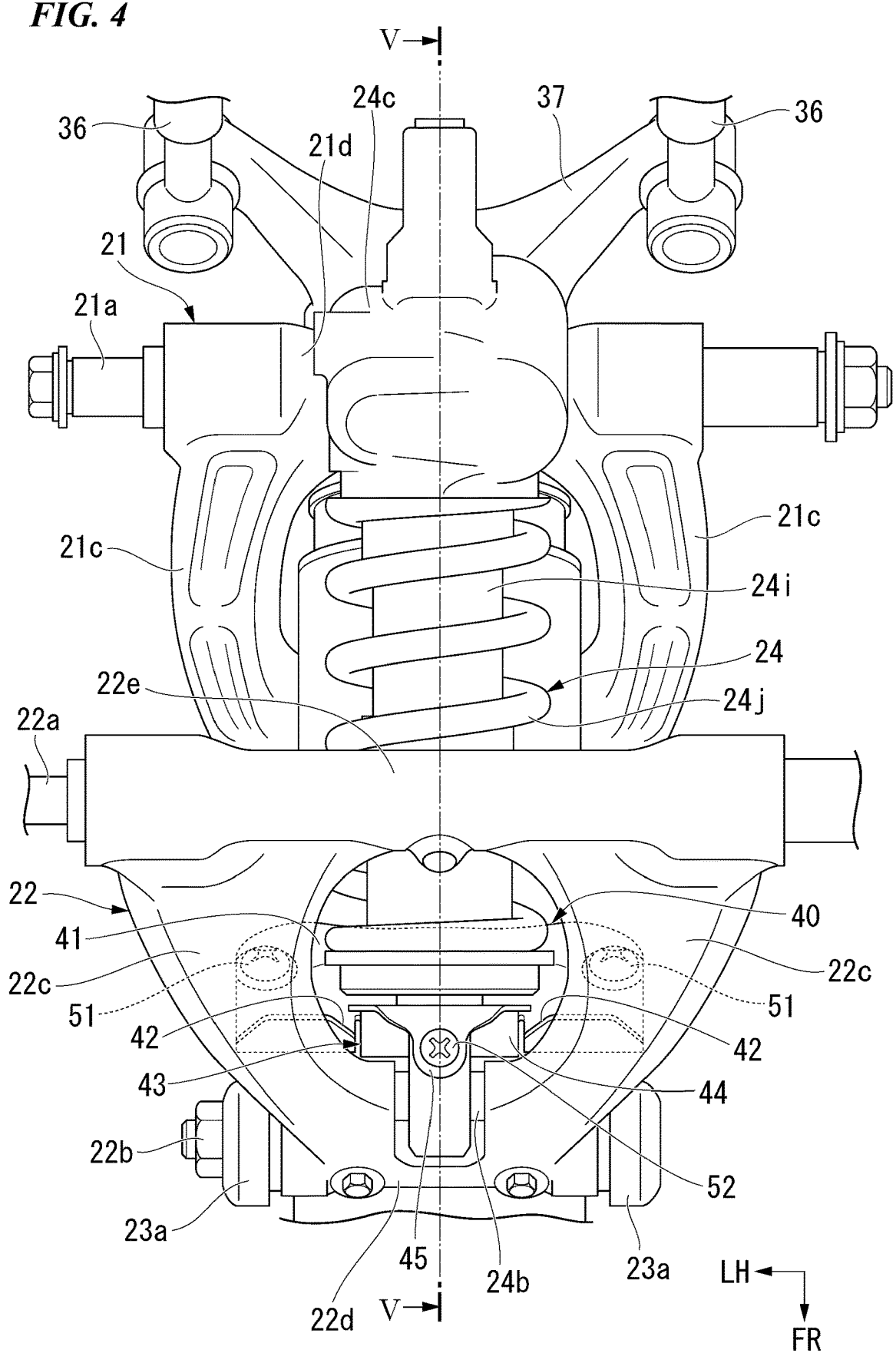
FIG. 4 is a view of the front part structure of the motorcycle when seen from a rear lower direction.

In a side view of FIG. 2, the front cushion unit 24 is arranged at a front upper position of the engine 4 and at a rear upper position of the front wheel 2. An upper part of the front cushion unit 24 is covered from the outside in the vehicle width direction by the main frame 11. As shown in FIG. 4, the front cushion unit 24 is supported by the support shaft 24b provided between the pair of right and left arms 22c.

In FIG. 2, a reference numeral 35 represents a handle post to which the handle 5 is fixed, a reference numeral 36 represents a steering system link having a rear end part that is connected to the handle post 35, and a reference numeral 37 represents a steering arm which is supported by an upper end part of the front wheel steering shaft 26 and to which a front end part of the steering system link 36 is connected.

<Cover>

As shown in FIG. 2, a cover 40 that covers a space between the pair of right and left lower arms 22c is provided between the front wheel steering shaft 26 and the front cushion unit 24. The cover 40 has flexibility. For example, the cover 40 is formed of an elastic body such as rubber. As shown in FIG. 3, a front part of the cover 40 is fixed to the fork support part 23 that has a cylindrical shape and that rotatably supports the front wheel steering shaft 26 by a pair of right and left first bolts 51 (first fixation member). Specifically, the front part of the cover 40 is fixed to the fork support part 23 from a rearward direction by the pair of right and left first bolts 51. In a side view of FIG. 2, the front part of the cover 40 is fixed along the shape of the rib 23b.

Figure 5:
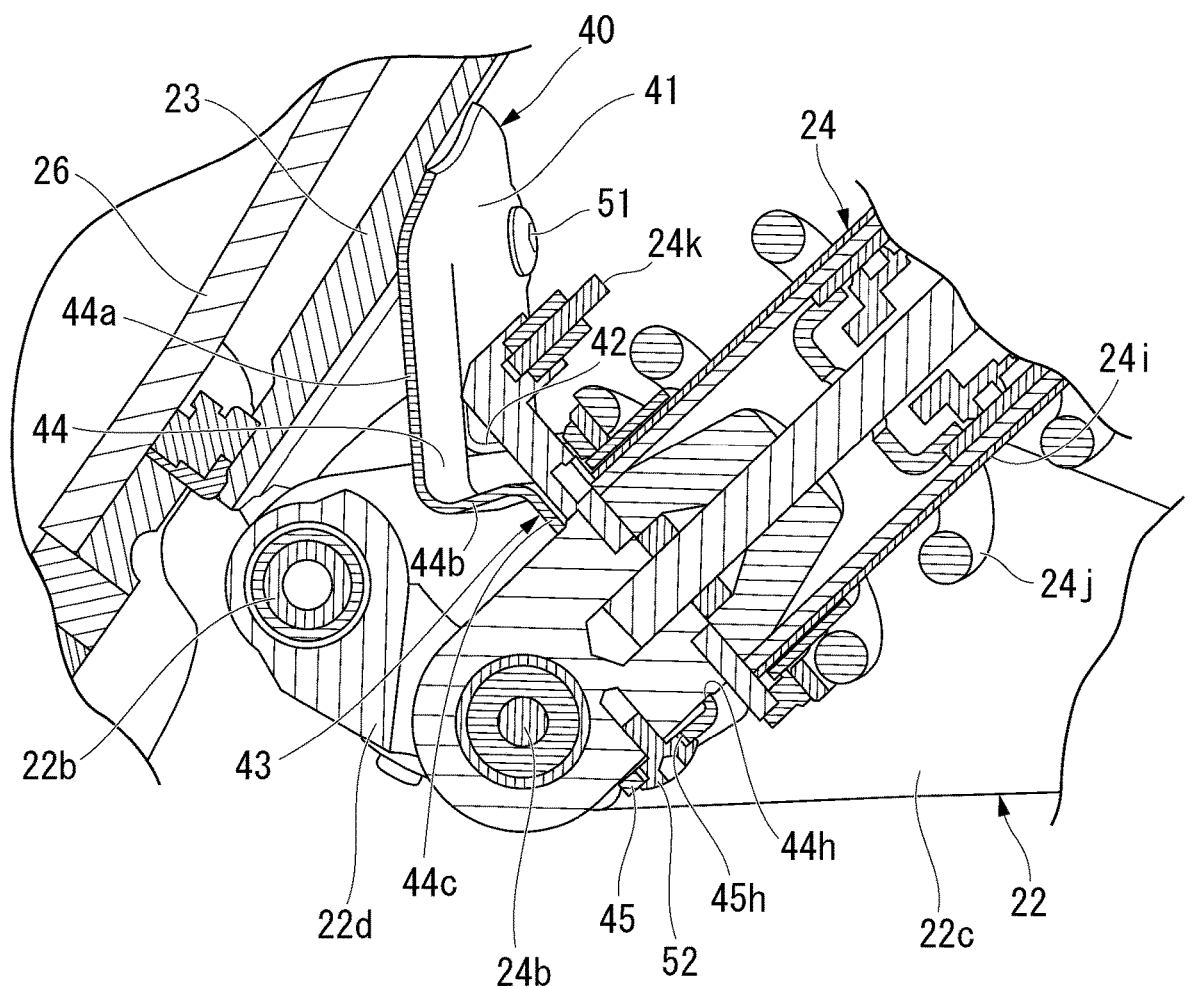
FIG. 5 is a V-V cross-sectional view of FIG. 4.
Figure 5:
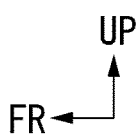

As shown in FIG. 5, a suspension insertion hole 44h through which the front cushion unit 24 is inserted is provided on the cover 40. A rear part of the cover 40 is fixed to the front cushion unit 24 by a second bolt 52 (second fixation member). Specifically, the rear part of the cover 40 is fixed to the front cushion unit 24 from the rearward direction by the second bolt 52.

As shown in FIG. 3, a bend part 40a that is bent along the fork support part 23 and the lower arm 22c is provided on the cover 40. The connection part 24k of the front cushion unit 24 is exposed from the cover 40. The connection part 24k of the front cushion unit 24 is not inserted through the cover 40.

The cover 40 includes a wide width part 41 that extends in the vertical direction along a rear portion of the fork support part 23 and that extends in the vehicle width direction, a pair of right and left first cover parts 42 that correspond to the pair of right and left lower arms 22c, and a second cover part 43 that corresponds to the front cushion unit 24. The pair of right and left first cover parts 42 and the second cover part 43 are displaceable independently from each other.

Figure 6:
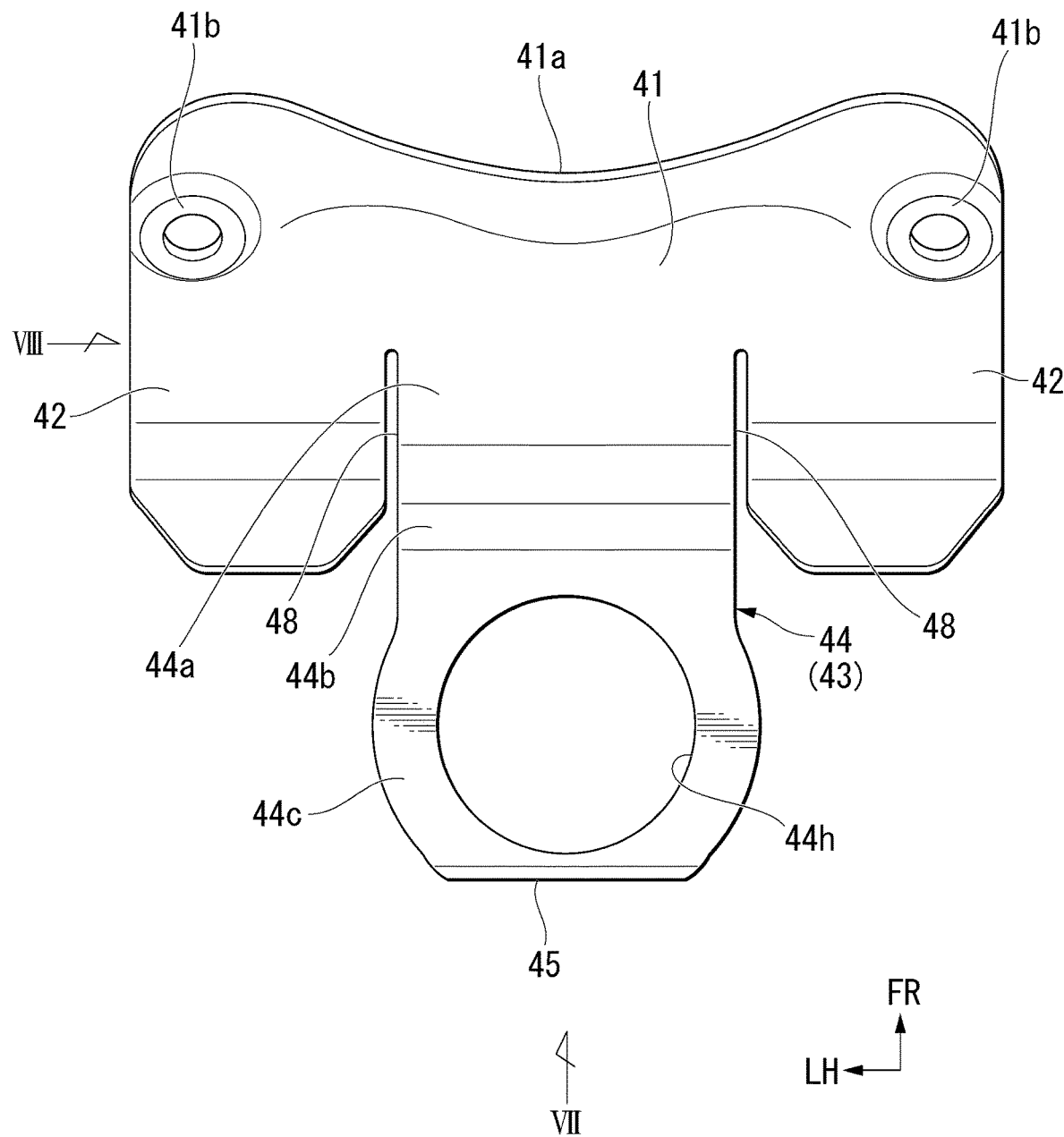
FIG. 6 is a top view of the cover when seen from an axis line direction of the suspension.
Figure 7:
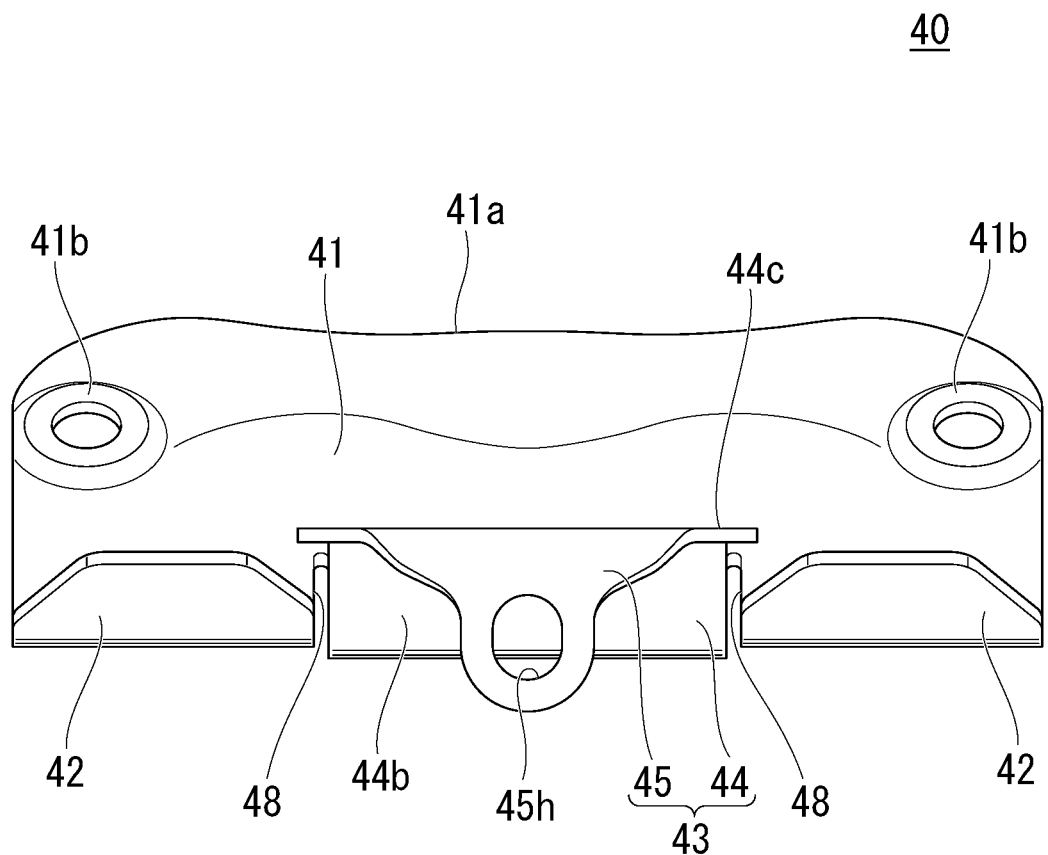
FIG. 7 is a view in an arrow VII direction of FIG. 6.
Figure 8:
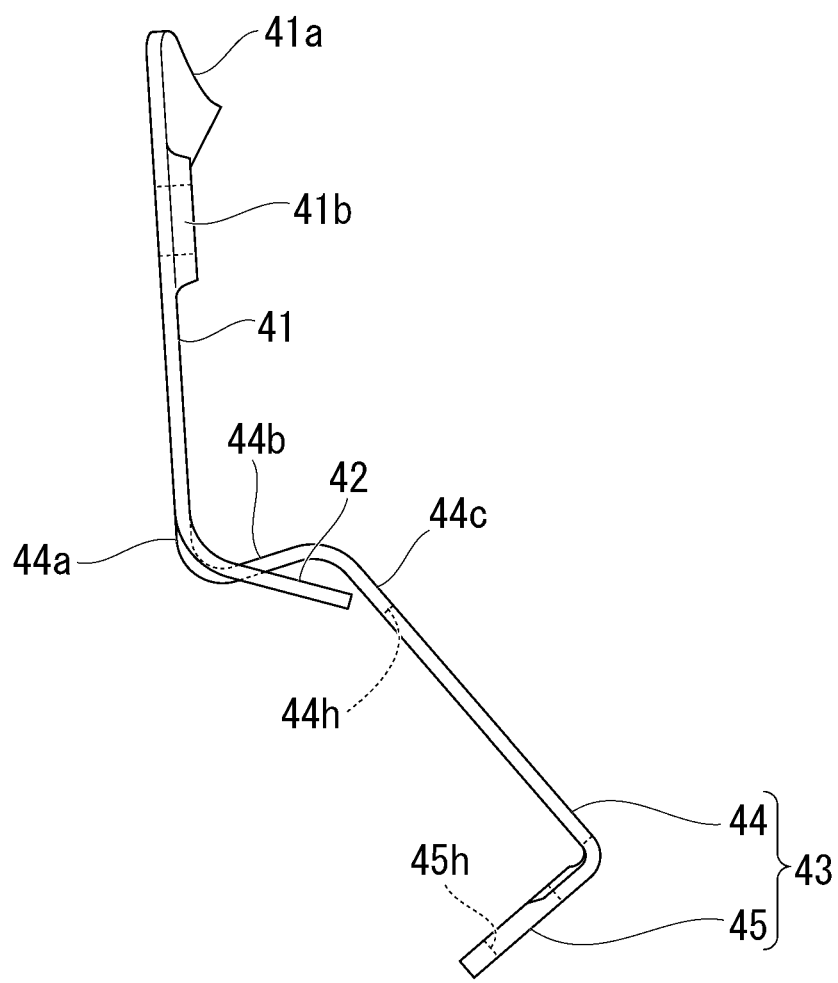
FIG. 8 is a view in an arrow VIII direction of FIG. 6.

FIG. 6 to FIG. 8 show a state of the cover 40 before the cover 40 is attached to the vehicle.

As shown in FIG. 6, the wide width part 41, the pair of right and left first cover parts 42, and the second cover part 43 are integrally formed of the same member. In a top view of FIG. 6, an outer shape of the cover 40 is symmetrical in the right-to-left direction. For example, the cover 40 is a molded component using a rubber material.

<Wide Width Part>

In the top view of FIG. 6, an upper end portion of the wide width part 41 is curved along the rear portion of the fork support part 23 (refer to FIG. 3). A recess part 41a recessed and curved inward (to a lower side) is provided on an upper end portion of the first wide width part 41. As shown in FIG. 6, a first boss 41b that has a cylindrical shape and that has an opening through which the first bolt 51 (refer to FIG. 3) can be inserted is provided on an outer end portion in the vehicle width direction of the wide width part 41. As shown in FIG. 7, the first boss 41b projects rearward from a rear surface of the first wide width part 41.

For example, as shown in FIG. 3, a shaft part of the first bolt 51 is inserted through the opening of the first boss 41b and is screwed to a female screw part (not shown) provided on the rib 23b. Thereby, the front part of the cover 40 can be fixed to the fork support part 23 from a rearward direction.

<First Cover Part>

In the side view of FIG. 8, the pair of right and left first cover parts 42 have a L shape. As shown in FIG. 6, the pair of right and left first cover parts 42 extend rearward from lower ends of right and left side portions of the wide width part 41, respectively. The pair of right and left first cover parts 42 cover front upper surfaces of the pair of right and left lower arms 22c, respectively (refer to FIG. 3). In the top view of FIG. 6, the first cover part 42 extends rearward from a lower end of the wide width part 41 with a uniform width, and then the width becomes narrower at a more rearward side.

Hereinafter, a state before the cover 40 is attached to the vehicle is referred to as an "initial state", and a state after the cover 40 is attached to the vehicle is referred to as an "attachment state". As shown in FIG. 8, the cover 40 in the initial state has an outer shape that is different from an outer shape of the cover 40 in the attachment state (refer to FIG. 5). Specifically, a rear end of the first cover part 42 of the cover 40 in the initial state is arranged at a lower position than a rear end of the first cover part 42 of the cover 40 in the attachment state. In other words, a rear portion of the first cover part 42 of the cover 40 in the initial state is arranged at a lower position than a front upper surface of the lower arm 22c of the vehicle. Thereby, the rear portion of the first cover part 42 of the cover 40 in the attachment state is in contact with the front upper surface of the lower arm 22c from above by its own elastic force (restoring force) and its own weight.

<Second Cover Part>

As shown in FIG. 6, the second cover part 43 is arranged to be spaced from the pair of right and left first cover parts 42 and in a space in the vehicle width direction between the pair of right and left first cover parts 42. The second cover part 43 extends from a lower end of a middle portion of the wide width part 41 toward a lower rear end of the front cushion unit 24 (refer to FIG. 5). As shown in FIG. 5, the second cover part 43 of the cover 40 in the attachment state is arranged at a lower position than the pair of right and left first cover parts 42.

The second cover part 43 includes a first extension portion 44 that extends rearward and downward in a crank shape from a lower end of the wide width part 41 and a second extension portion 45 that extends frontward and downward from a rear end of the first extension portion 44 (refer to FIG. 8).

As shown in FIG. 8, the first extension portion 44 includes a front extension section 44a that extends downward from a lower end of the wide width part 41, a middle extension section 44b that extends rearward from a lower end of the front extension section 44a, and a rear extension section 44c that extends rearward and downward from a rear end of the middle extension section 44b.

The second extension portion 45 extends frontward and downward from a rear end of the rear extension section 44c. In a side view, the rear extension section 44c and the second extension portion 45 define a L shape that opens in the frontward direction. In the side view of FIG. 5, the second extension portion 45 extends along an axis line direction of the front cushion unit 24.

As shown in FIG. 3, the first extension portion 44 has a space having a size in which a component can be accommodated between the pair of right and left lower arms 22c in the vehicle width direction. In a top view of FIG. 6, the front extension section 44a of the first extension portion 44 has a width that is smaller than a spacing between the pair of right and left first cover parts 42 in the vehicle width direction. In the top view of FIG. 6, the first extension portion 44 extends rearward from the lower end of the wide width part 41 with a uniform width and then projects so as to define an arc shape that is convex outward in the vehicle width direction. A suspension insertion hole 44h having a circular shape is provided on the rear extension section 44c of the first extension portion 44.

As shown in FIG. 5, one lower opening 45h that opens such that the second bolt 52 can be inserted through the lower opening 45h is provided on the second extension portion 45. For example, the shaft part of the second bolt 52 is inserted through the lower opening 45h of the second extension portion 45 and is screwed to a female screw part (not shown) at a lower end part of the front cushion unit 24. Thereby, the rear part of the cover 40 can be fixed to the lower end part of the front cushion unit 24 from the rearward direction.

<Slit>

As shown in FIG. 6, the cover 40 has a slit 48 that extends in the front-to-rear direction between the pair of right and left first cover parts 42 and the second cover part 43. A length of the slit 48 is larger than a swing amount of the front cushion unit 24. The length of the slit 48 means a total length of the slit 48 when the cover 40 is expanded in a planar shape. For example, the length of the slit 48 can be preferably larger than a maximum swing amount (or a maximum stroke amount) of the front cushion unit 24.

Here, a fixation position of the front part of the cover 40 is defined as a "front fixation position", and a fixation position of the rear part of the cover 40 is defined as a "rear fixation position". The front fixation position corresponds to the center of the opening of the first boss 41b. The rear fixation position corresponds to the center of the lower opening 45h of the second extension portion 45. For example, the length of the slit 48 can be preferably be equal to or more than half of the length between the front fixation position and the rear fixation position. The length between the front fixation position and the rear fixation position means a distance between the front fixation position and the rear fixation position when the cover 40 is expanded in a planar shape.

<Operation and Advantage>

As described above, in the front part structure of the motorcycle according to the embodiment described above, the front cushion unit 24 is arranged at a rearward position of the front wheel steering shaft 26 and at an upward position of the engine 4, the front cushion unit 24 is supported by the support shaft 24b that is provided between the pair of right and left lower arms 22c, the cover 40 that covers a space between the pair of right and left lower arms 22c is provided between the front wheel steering shaft 26 and the front cushion unit 24, the cover 40 includes the pair of right and left first cover parts 42 that correspond to the pair of right and left lower arms 22c and the second cover part 43 that corresponds to the suspension 24, and the pair of right and left first cover parts 42 and the second cover part 43 are displaceable independently from each other.

According to this configuration, when a component layout around the front cushion unit 24 is changed in accordance with a required specification of the front cushion unit 24 (for example, when a component such as the actuator 24c is arranged at an upper part of the front cushion unit 24), it is possible to set the heights of the pair of right and left first cover parts 42 and the height of the second cover part 43 to be different from each other. Accordingly, it is possible to maintain a stroke amount of the front cushion unit 24.

In the embodiment described above, the second cover part 43 is arranged at a lower position than the pair of right and left first cover parts 42, and thereby, the following advantages are achieved.

It is possible to increase a stroke amount of the front cushion unit 24 compared to a case in which the second cover part 43 is arranged at a height equal to or higher than a height of the pair of right and left first cover parts 42.

In the embodiment described above, the cover 40 has the slit 48 between the pair of right and left first cover parts 42 and the second cover part 43, and thereby, the following advantages are achieved.

The pair of right and left first cover parts 42 and the second cover part 43 becomes smoothly displaceable independently from each other compared to a case in which there is an interposed part between the pair of right and left first cover parts 42 and the second cover part 43. Accordingly, the front cushion unit 24 can be smoothly stroked.

In the embodiment described above, the length of the slit 48 is larger than a swing amount of the front cushion unit 24, and thereby, the following advantages are achieved.

It is possible to increase a stroke amount compared to a case in which the length of the slit 48 is equal to or less than the swing amount of the front cushion unit 24. Additionally, it is possible to arrange a large front cushion unit 24.

In the embodiment described above, the pair of right and left first cover parts 42 are in contact with the pair of right and left lower arms 22c, and thereby, the following advantages are achieved.

Since each of the pair of right and left first cover parts 42 follows the motion of each of the pair of right and left lower arms 22c, the pair of right and left first cover parts 42 can block a gap that occurs at the time of swing of the pair of right and left lower arms 22c. Additionally, it is possible to prevent the first cover part 42 from being caught at the time of swing of the lower arm 22c.

In the embodiment described above, the cover 40 has flexibility, and the fork support part 23 that has a cylindrical shape and that rotatably supports the front wheel steering shaft 26 and the bend part 40a that is bent along the lower arm 22c are provided on the cover 40. Thereby, the following advantages are achieved.

Since the cover 40 follows the motion of the pair of right and left lower arms 22c, it is possible to block a gap that occurs at the time of swing of the pair of right and left lower arms 22c by the cover 40.

In the embodiment described above, the cover 40 further includes the wide width part 41 that extends in the vertical direction along the rear portion of the fork support part 23 which has a cylindrical shape and which rotatably supports the front wheel steering shaft 26 and that extends in the vehicle width direction, each of the pair of right and left first cover parts 42 extends rearward from the lower end of each of the right and left side portions of the wide width part 41 and covers the upper surface of the pair of right and left lower arms 22c, and the second cover part 43 is arranged to be spaced from the pair of right and left first cover parts 42 and in the space in the vehicle width direction between the pair of right and left first cover parts 42 and extends from the lower end of the middle portion of the wide width part 41 toward the lower rear end of the front cushion unit 24. Thereby, the following advantages are achieved.

The wide width part 41, the first cover part 42, and the second cover part 43 can allow a clearance around the front cushion unit 24 to be as small as possible.

In the embodiment described above, the second cover part 43 includes the first extension portion 44 that extends rearward and downward from the lower end of the wide width part 41 and the second extension portion 45 that extends frontward and downward from the rear end of the first extension portion 44, and the second extension portion 45 extends along the axis line direction of the front cushion unit 24. Thereby, the following advantages are achieved.

It is possible to attach the cover 40 without depending on expansion and contraction of the front cushion unit 24.

<Modified Example>

The above embodiment is described using an example in which the cover 40 has the slit 48 between the pair of right and left first cover parts 42 and the second cover part 43; however, the embodiment is not limited thereto. For example, the cover 40 may not have the slit 48 between the pair of right and left first cover parts 42 and the second cover part 43. For example, there may be an interposed part between the pair of right and left first cover parts 42 and the second cover part 43. For example, the cover 40 may have a bellows structure between the pair of right and left first cover parts 42 and the second cover part 43. That is, the pair of right and left first cover parts 42 and the second cover part 43 may be displaceable independently from each other.

The above embodiment is described using an example in which the front part of the cover 40 is fixed to the fork support part 23 by the pair of right and left first bolts 51; however, the embodiment is not limited thereto. For example, the front part of the cover 40 may be fixed to the fork support part 23 by one bolt in the middle or three or more bolts.

The above embodiment is described using an example in which the rear part of the cover 40 is fixed to the front cushion unit 24 by a single second bolt 52; however, the embodiment is not limited thereto. For example, the rear part of the cover 40 may be fixed to the front cushion unit 24 by two or more bolts.

The above embodiment is described using an example in which the first fixation member and second fixation member are a bolt (fastening member); however, the embodiment is not limited thereto. For example, at least one of the first fixation member and second fixation member may be another member such as a tape, a rivet, and a clip.

The above embodiment is described using an example in which the front cushion unit 24 is an electronically controlled suspension having the connection part 24k; however, the embodiment is not limited thereto. For example, the front cushion unit 24 may be a normal suspension that does not have the connection part 24k.

The above embodiment is described using an example in which the front fork is a front swing arm that constitutes a front suspension mechanism; however, the embodiment is not limited thereto. For example, the front fork may be a telescopic front fork suspension (front fork).

The above embodiment is described using an example in which the engine is a horizontal multicylinder engine; however, the embodiment is not limited thereto. For example, the engine may be a parallel multicylinder engine or a single cylinder engine. That is, it is possible to employ various types of engines.

The present invention is not limited to the embodiment described above. For example, the saddle riding vehicle includes all types of vehicles on which a driver rides on a vehicle body and includes not only a motorcycle (including a motorized bicycle and a scooter-type vehicle) but also a three-wheel vehicle (including a two-front-wheeled and one-rear-wheeled vehicle in addition to one-front-wheeled and two-rear-wheeled vehicle). Further, the present invention is applicable not only to a motorcycle but also to a four-wheeled vehicle such as an automobile.

The configurations in the embodiment described above is an example of the present invention, and various modifications such as replacing the components of the embodiment with known components can be made without departing from the scope of the invention.

What is claimed is:

1. A saddle-riding-vehicle front part structure comprising:
    a suspension that is arranged at a rearward position of a steering shaft and at an upward position of a power source;
    a support shaft that supports the suspension and that is provided between a pair of right and left arms; and
    a cover that is provided between the steering shaft and the suspension and that covers a space between the pair of right and left arms,
    wherein the cover comprises
        a pair of right and left first cover parts that correspond to the pair of right and left arms and
        a second cover part that corresponds to the suspension, and
    the pair of right and left first cover parts and the second cover part are displaceable independently from each other.

2. The saddle-riding-vehicle front part structure according to claim 1,
    wherein the second cover part is arranged at a lower position than the pair of right and left first cover parts.

3. The saddle-riding-vehicle front part structure according to claim 1,
    wherein the cover has a slit between the pair of right and left first cover parts and the second cover part.

4. The saddle-riding-vehicle front part structure according to claim 3,
    wherein a length of the slit is larger than a swing amount of the suspension.

5. The saddle-riding-vehicle front part structure according to claim 1,
    wherein the pair of right and left first cover parts are in contact with the pair of right and left arms.

6. The saddle-riding-vehicle front part structure according to claim 1,
    wherein the cover has flexibility, and
    a holder that has a cylindrical shape and that rotatably supports the steering shaft and a bend part that is bent along the arm are provided on the cover.

7. The saddle-riding-vehicle front part structure according to claim 1,
    wherein the cover further comprises a wide width part that extends in a vertical direction along a rear part of a holder which has a cylindrical shape and which rotatably supports the steering shaft and that extends in a vehicle width direction,
    each of the pair of right and left first cover parts extends rearward from a lower end of each of right and left side portions of the wide width part and covers an upper surface of the pair of right and left arms, and
    the second cover part is arranged to be spaced from the pair of right and left first cover parts and in a space in the vehicle width direction between the pair of right and left first cover parts and extends from a lower end of a middle portion of the wide width part toward a lower rear end of the suspension.

8. The saddle-riding-vehicle front part structure according to claim 7,
    wherein the second cover part comprises
    a first extension portion that extends rearward and downward from a lower end of the wide width part and
    a second extension portion that extends frontward and downward from a rear end of the first extension portion, and
    the second extension portion extends along an axis line direction of the suspension.

* * * * *